Jan. 7, 1964
O. C. SEVERSON
3,116,538
MILLING CUTTER HAVING INDEXIBLE AND
DISPOSABLE CUTTING INSERTS
Filed June 25, 1959
2 Sheets-Sheet 1
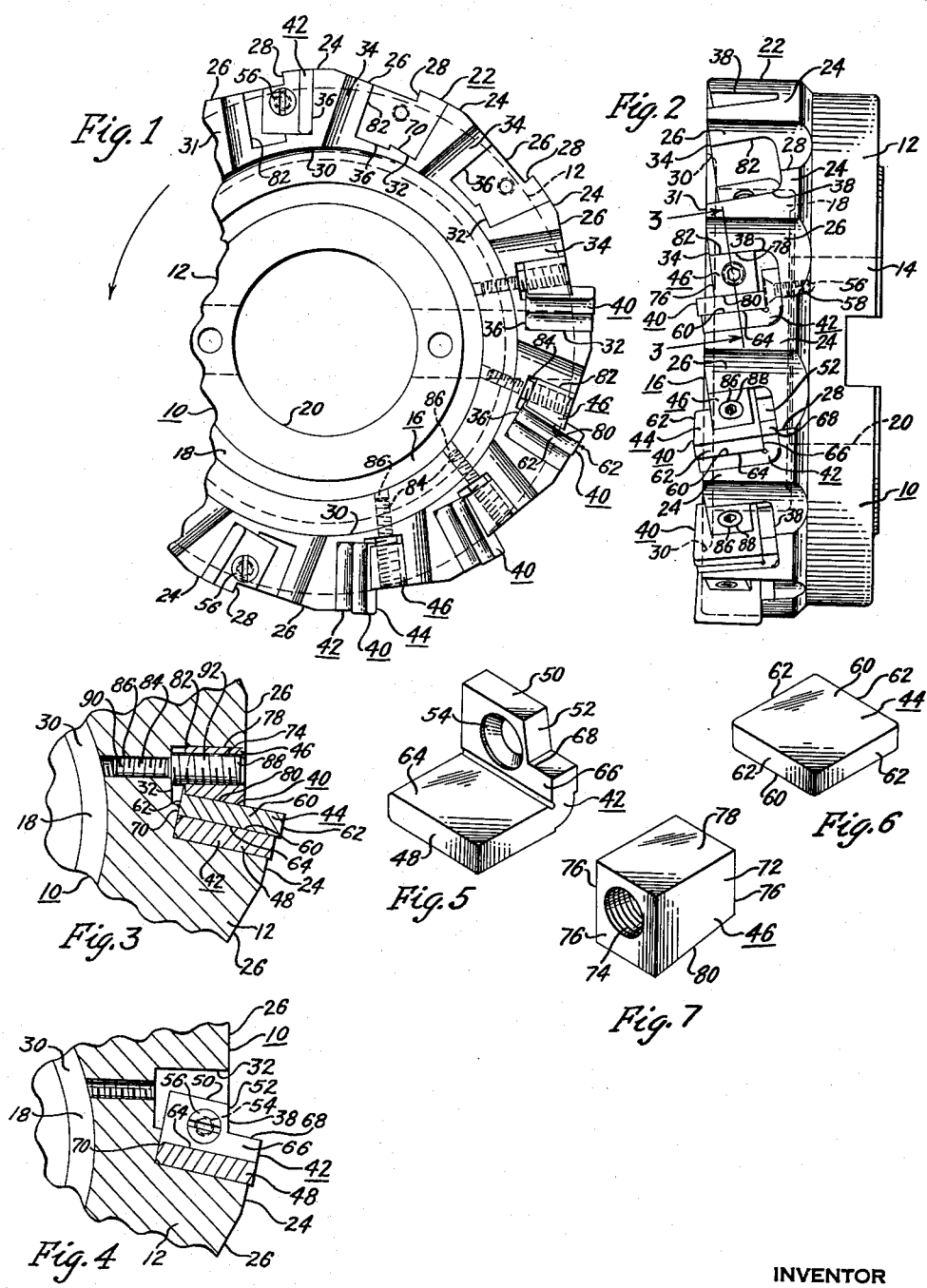
INVENTOR
Ole C. Severson
BY
Wooster, Davis & Cifelli
ATTORNEYS Jan. 7, 1964
O. C. SEVERSON
3,116,538
MILLING CUTTER HAVING INDEXIBLE AND
DISPOSABLE CUTTING INSERTS
Filed June 25, 1959
2 Sheets-Sheet 2
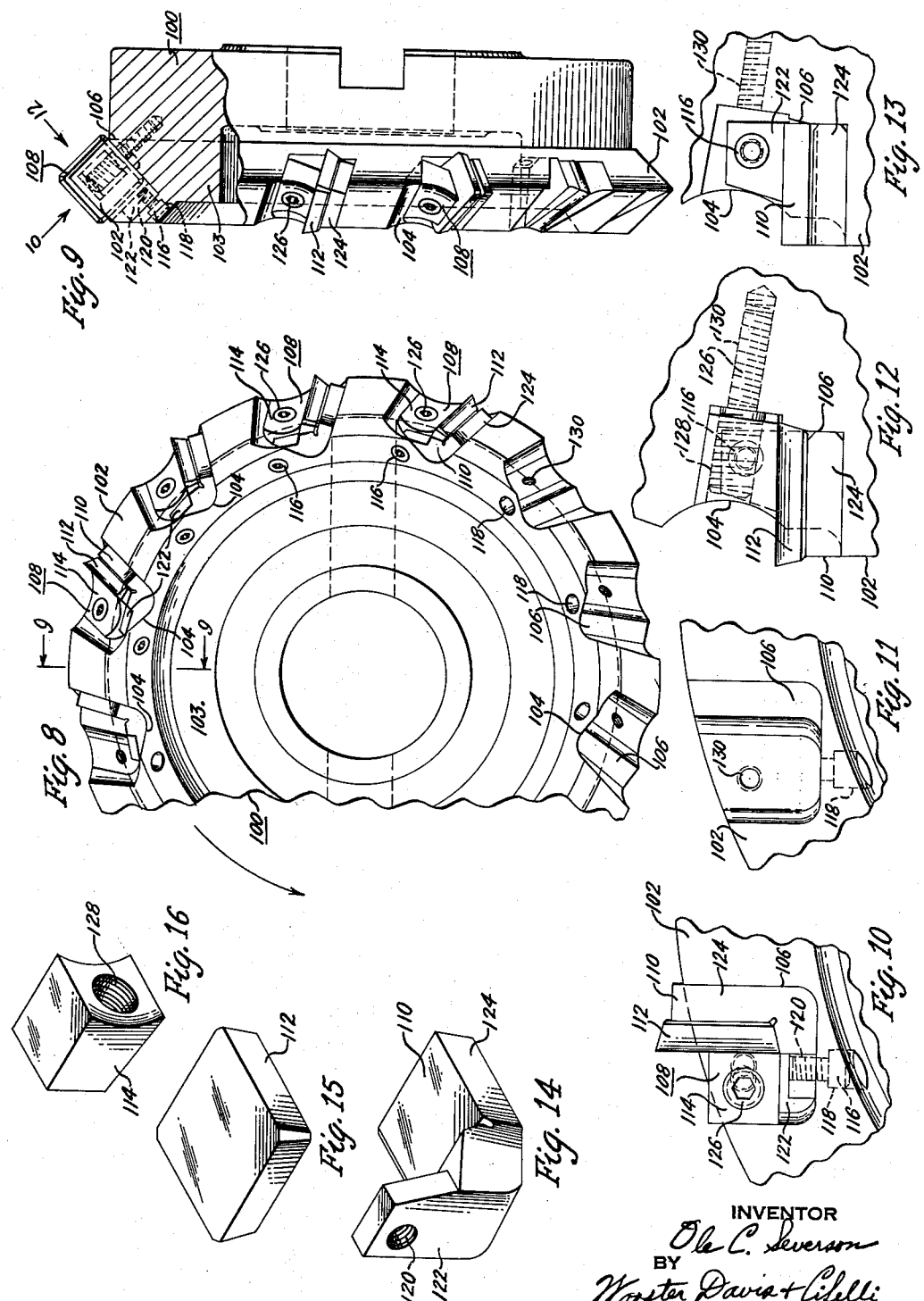
INVENTOR
Ole C. Severson
BY
Worster, Davis + Cifelli
ATTORNEYS

United States Patent Office 3,116,538
Patented Jan. 7, 1964

1

3,116,538
MILLING CUTTER HAVING INDEXIBLE AND
DISPOSABLE CUTTING INSERTS
Ole C. Severson, Shelton, Conn., assignor to The Viking
Tool Company, Shelton, Conn., a corporation of
Connecticut
Filed June 25, 1959, Ser. No. 822,845
3 Claims. (Cl. 29—105)

This invention relates to milling cutters for milling machines.

In practice, milling machines usually include cutting means in the form of a power driven, rotary, integral milling cutter having a plurality of integrally formed, spaced, cutting teeth which are disposed either for face cutting or peripheral cutting, and wherein the milling cutter is mounted in the milling machine so as to be capable of performing a milling operation, as by being mounted for movement relative to the work to make either a face or peripheral cut. The manufacture, use and maintenance of known milling cutters is expensive and involves many problems, among which are: (1) the need to provide accurately positioned cutting teeth, which is difficult to achieve when dealing with an integral milling cutter; (2) the need to provide hardened cutting teeth, which usually are formed of expensive, brittle materials and are costly to manufacture; (3) the need to maintain the cutting teeth in proper operating condition, principally by keeping them properly ground, and the high maintenance expense incident thereto which results from the necessity of handling the entire milling cutter when regrinding the teeth; (4) the costly nature and inconvenience of repair in the event the cutting teeth are damaged, because the entire milling cutter must be removed from the milling machine to be repaired or replaced, and (5) the difficulty of maintaining the milling cutter in condition so that it may be "trued up" easily when mounted in operating position on the milling machine.

It is an object of this invention generally to provide an improved milling cutter for a milling machine, and particularly to provide one wherein the problems in known milling cutters enumerated in the preceding paragraph are eliminated.

The object of this invention is achieved in one form by providing a milling cutter in the form of a cutter body having a plurality of spaced notches, and including cutting teeth in the form of separate, cutting teeth assemblies that are individually mounted in the notches, and each of which includes a separate indexible cutting insert, a separate anvil and a separate clamping member.

The above and other objects and further details of that which I believe to be novel and my invention will be clear from the following description and claims taken with the accompanying drawings, wherein:

FIG. 1 is a fragmentary front elevational view of a milling cutter which incorporates the instant invention;

FIG. 2 is a side elevational view thereof;

FIG. 3 is a sectional view taken substantially on line 3—3 of FIG. 2;

FIG. 4 is a view which is substantially the same as FIG. 3 except that the cutting insert, clamping wedge and clamping wedge screw are not shown;

FIG. 5 is a perspective view of the anvil which forms a part of the FIG. 1 milling cutter;

2

FIG. 6 is a perspective view of the cutting insert which forms a part of the FIG. 1 milling cutter;

FIG. 7 is a perspective view of the clamping wedge which forms a part of the FIG. 1 milling cutter;

FIG. 8 is a fragmentary front elevational view of another milling cutter which incorporates the instant invention;

FIG. 9 is a side elevational view thereof, with portions broken away and shown in section substantially on line 9—9 of FIG. 8;

FIG. 10 is an elevational view looking substantially in the direction of the left-hand arrow in FIG. 9;

FIG. 11 is a view which is substantially the same as FIG. 10, except that the cutting insert, anvil, clamping wedge and associated screws are not shown;

FIG. 12 is an elevational view looking substantially in the direction of the right-hand arrow in FIG. 9;

FIG. 13 is a view which is substantially the same as FIG. 12 with the exception that the cutting insert, clamping wedge and clamping wedge screw are not shown;

FIG. 14 is a perspective view of the anvil which forms a part of the FIG. 8 milling cutter;

FIG. 15 is a perspective view of the milling cutter which forms a part of the FIG. 8 cutting insert, and FIG. 16 is a perspective view of the milling cutter which forms a part of the FIG. 8 clamping wedge.

Referring to the drawings, there are two embodiments of the invention illustrated. In FIGS. 1-7, there is illustrated a milling cutter having a plurality of cutting teeth in the form of separate, circumferentially spaced, individually mounted, indexible, replaceable and disposable square cutting inserts that are disposed so as to have a negative rake in both the radial and axial directions, and wherein the cutting edges of the cutting inserts which are in position to function as cutting implements are disposed at right angles to each other, the radial cutting implement edges being disposed in a common vertical plane which is parallel to the face of the piece of work that is to be milled, and the axial cutting implement edges being disposed to fall in a common cylinder formed by rotating the milling cutter about its axis.

In FIGS. 8-16 there is illustrated a milling cutter having a plurality of cutting teeth which are generally similar to those of the FIGS. 1-7 milling cutter, but which are disposed so as to have a negative rake in the radial direction and a positive rake in the axial direction, and wherein the cutting edges of the cutting inserts that are disposed to function as cutting implements are disposed at right angles to each other, the cutting implement edges that are on the face side of the milling cutter being disposed at an angle of approximately forty-five degrees to the milling cutter axis. The two illustrated milling cutters, as will be apparent to those skilled in the art, are designed for different types of milling operations. Both, however, incorporate the same inventive concept, and it should be clearly understood that many other dispositions of the cutting teeth to effect various rakes and milling cutter styles may be utilized, if desired, and still be within the purview of the instant invention. Furthermore, other shaped cutting inserts, such as other polygons, may be used with appropriate alteration of the mounting structure therefor, if desired.

In FIGS. 1-7, the milling cutter is generally designated by reference numeral 10. The milling cutter generally comprises a cutter body and cutter teeth. The cutter body 12 is generally circular, disk-like, and may effectively and economically be made of an appropriate alloy steel. One axial side 14 of the cutter body is formed with conventional mechanism for detachably securing the cutter body to the rotary, power driving means of the milling machine, and is designated the mounting side. The other axial side 16 of the cutter body is designated as the cutter face side and supports the cutting teeth. The cutter face side 16 has an axially extending recess 18 of varying diameter and axial depth formed therein, and centrally of the cutter body there is formed an axial opening 20 which extends completely therethrough. The cutter face side 16 is of greater radial extent than the mounting side 14 of the cutter body. The periphery of the mounting side 12 is cylindrical, but the periphery 22 of the cutter face side is not a uniformly cylindrical peripheral surface. As can best be seen in FIG. 1, the periphery 22 is formed by a plurality of spaced, arcuate, peripheral wall portions 24 which fall in a common cylinder, adjacent, inclined, flat wall portions 26, and generally radial, connecting shoulders 28.

Spaced inwardly of the periphery 22, the cutter face side 16 has a radially inner circular edge 30 formed by the radially outermost portion of the recess 18. The face wall portion 31 of the cutter face side between the periphery 22 and the circular edge 30 has a plurality of circumferentially spaced, axially extending, deep, boxy notches 32 formed therein, and a plurality of shallow, cutaway portions 34, one formed adjacent each notch and on the same side thereof. Each of the notches 32 is open on two of its sides, an axial side 36 in the face wall portion 31 and which opens on the cutter face side, and a radially outer side 38 which opens to the periphery of the cutter body. As can best be seen in FIG. 1, the axial side 36 of the notch is non-symmetrical, whereas, as can best be seen in FIG. 2, the peripheral side 38 of the notch is substantially symmetrical about an axis which is slightly inclined to the main axis of the cutter body.

The cutting teeth are formed by a plurality of cutting teeth assemblies, each of which includes a separate, individually mounted, cutting insert which is individually indexible, replaceable and disposable. In each of the notches 32 there is disposed one such cutting tooth assembly 40. Each cutting tooth assembly 40 generally comprises an anvil 42, a cutting insert 44 and a clamping wedge 46.

The anvil 42 can best be seen in FIG. 5, and comprises a bent piece of hard material, such as hardened steel, which forms two portions 48 and 50 which are disposed approximately at right angles to each other. Portion 50 has a cut-out 52 and a countersunk opening 54 formed therein. The anvil 42 is adapted to be rigidly and removably mounted in a notch 32 (see FIG. 4) by having a flat-headed, cap screw 56 passed through the anvil opening 54 and threadedly secured in the threaded bore 58 formed in the cutter body. It will be understood that there are a plurality of spaced, threaded bores 58, one associated with each notch 32, and that a separate anvil 42 is individually mounted in each notch. As can best be seen in FIG. 2, the bores 58, one of which is illustrated in dotted lines, extend generally axially, although they are slightly askew to the main axis of the cutter body.

The cutting insert 44 can best be seen in FIG. 6, is generally wafer-like and square in major outline, is made of a very hard material, such as tungsten carbide, other carbides, or the equivalent, and comprises a pair of spaced, parallel planar walls 60 and four, flat, side walls 62. When in operative position, an individual cutting insert 44 is disposed in each notch 32 so as to have one of its planar walls 60 in substantial planar contact with the flat wall 64 of the anvil portion 48 (see FIG. 3). When so positioned, one of its cutting insert side walls 62 is in contact with a flat wall portion 66 of the anvil portion 50 which is perpendicular to the flat wall 64 of anvil portion 48, and the planar wall 69 of the cutting insert which is spaced from the flat wall 64 is in line with one side 68 of the cut-out 52. When so positioned, an adjacent side wall 62 of the cutting insert is in partial contact with the portion 70 of the irregular base surface of the notch 32, when viewed from the axial side 36 thereof (see FIG. 3). When so positioned, the two remaining adjacent cutting insert side walls extend beyond the cutter body into positions where they function as cutting implements, an edge of one of them being radially disposed, and an edge of the other being axially disposed.

The clamping wedge 46 comprises a unitary block-like member 72 which is made of ground tool steel or the equivalent and has an elongated threaded bore 74 formed therein, four flat side walls 76 which are disposed to form a rectangle, a flat top wall 78 which is disposed in a plane which is perpendicular to the planes of the side walls 76, and an inclined bottom wall 80. It will be understood that the directional references apply to the FIG. 7 disposition of the clamping wedge and are solely for the sake of convenience; when operatively mounted in the cutter body, these directional references are not applicable.

An individual clamping wedge 46 is disposed in each notch 32 in such a manner as to have its flat wall 78 in slidable planar contact with the side 82 of the notch and its inclined wall 80 in slidable planar contact with the planar wall 60 of the cutting insert 44 which is spaced from the anvil flat wall 64. The dispositional relationship of the parts of each cutting tooth assembly 40 in its associated notch 32 is such that the clamping wedge 46 is arranged to selectively exert substantial, planar, clamping pressure on its associated cutting insert which forces the latter into substantial, planar contact with its associated anvil flat wall portion 64 to clamp and securely lock the cutting insert in operative position.

The clamping wedges 46 are arranged to be selectively manually operated so as to be adjustable to permit the initial mounting and clamping of their associated cutting inserts, and the subsequent removal of such cutting inserts for the purpose of being indexed or replaced. The means for adjustably mounting the clamping wedges 46 is designed to provide for rapid clamping and unclamping action of the clamping wedges. This action is effected by clamping wedge screws 84, one of which is associated with the threaded bores 74 in the clamping wedges, and threaded bores 86 which are adjacent to and associated with the notches 32. Each screw 84 has an internally socketed head 88, which is illustrated as being hexagonal, for the receipt of an appropriate adjusting tool, but which may have other configurations. Each screw 84 comprises two portions, a forward portion 90 of reduced diameter and which has a right-hand thread formed therein, and a rear portion 92 of enlarged diameter and which has a left-hand thread formed therein. The forward portion 90 is received in a threaded bore 86 and the rear portion 92 is received in a threaded bore 74 in its associated clamping wedge. The bores in which the screw portions are received are threaded in a similar manner to that of their associated screw portions. The overall cooperative action of the screws 84 and their associated bores is such that turning the screws 84 in one direction results in rapid movement of the clamping wedge 46 in one axial direction of the screws, and turning the screws in the opposite direction results in rapid movement of the clamping wedge in the other direction.

When fully assembled on the cutter body 12 in a notch 32, each cutting tooth assembly 40 is disposed as illustrated, particularly in FIGS. 1 and 2. Any number of cutting teeth assemblies may be employed, such as 8 to 16, depending upon the particular usage. Each cutting insert 44 is individually clamped against its associated anvil 42 by its associated clamping wedge 46, and is individually adjustably and removably mounted. When mounted in operative position, one of its side walls 62 has an edge thereof disposed generally radially and which constitutes a cutting implement. It will be understood that the cutting inserts 44 are adjusted individually so as to dispose these radially extending cutting edges in the same plane. Another of the cutting insert side walls 62 forms a peripheral cutting edge which extends generally axially. Here also, the cutting inserts 44 are individually adjusted so as to dispose these cutting edges in a common cylinder formed by rotating the cutter body 12.

The operation of the cutting teeth assemblies when the milling cutter is utilized is generally the same as that of known milling cutters. The milling cutter is rotated by its driving means in the direction of the arrow in FIG. 1. When making a face cut, a side wall 76 of each clamping wedge 46 cooperates with an adjacent cut-away portion 34 of the cutter body 12 to function as exit means for the chips that are formed during the milling cutting operation. When making a peripheral cut, a wall 76 of each clamping wedge 46 and its adjacent inclined peripheral wall 26 of the cutter body 12 function as exit means for chips formed during such a milling cutting operation.

With the foregoing milling cutter construction, significant economies in the cost of manufacture and maintenance are effected, principally because each of the cutting teeth comprises a separate, indexible, replaceable and disposable cutting insert. By the latter, it should be understood that when a cutting insert side wall edge becomes dull through use, the cutting insert may be loosened, turned and tightened to expose a fresh cutting edge, and that when all the edges are worn, the cutting insert may be disposed of and replaced by a new or reground one. Only the cutting inserts are made of costly cutting materials, and they and their associated parts, principally the anvils and clamping wedges, may be individually made and repaired by unskilled labor on a mass production basis. The individual parts of the cutting teeth assemblies are interchangeable, and therefore, may be used in place of their corresponding parts in different assemblies and in different cutter bodies. If cutting inserts are damaged during use, only the cutting inserts or their associated anvils are likely to become damaged, thereby protecting the cutter body 12. If this occurs, only the damaged parts need be replaced, and this may be accomplished without even removing the milling cutter from the milling machine. Further economies are effected by not requiring the cutter body to be made of a very hard material. Furthermore, the cutter teeth assemblies may be more accurately and easily formed, because they are separate, readily handled, small parts compared with the complete known milling cutter. Lastly, the support of the individual cutting inserts, which are made of costly, brittle material, is such as to make maximum use of such material for cutting purposes, and minimize damage thereto by providing for maximum planar support of them up to their cutting edges. In the latter connection, it should be observed that the cutting inserts are supported over substantial planar portions thereof, that each side wall thereof is independently usable as a cutting implement, and that the side walls of the cutting inserts that are not being used as cutting implements are protected by the anvil and cutter body when not in cutting use.

The milling cutter illustrated in FIGS. 8–16 is constructed and operates in generally the same manner as the one illustrated in FIGS. 1–7, and produces the same general advantages. The principal difference is that the milling cutter style, rake and cutting insert disposition are different, as was pointed out above in the initial portion of this specification, to effect a different type of milling operation.

The FIGS. 8–16 milling cutter comprises a cutter body 100 which is generally similar to the cutter body of the first embodiment, except that it includes a V-shaped, peripheral, radially extending ridge 102 on its cutter face side 103. A plurality of double arcuate, cut-out portions 104 are spaced about the periphery of the ridge 102 and are formed therein. In each cut-out portion 104 there is formed a notch 106 which is V-shaped in cross section (see FIG. 9) and in which there is mounted a cutting tooth assembly 108. Each cutting tooth assembly 108 comprises an anvil 110, a cutting insert 112 and a clamping wedge 114, each of which generally corresponds to its counterpart in the FIGS. 1–7 milling cutter. The anvils 110 are individually rigidly and removably secured in the notches 106, as by having hexagonally socketed, cap screws 116 passed through openings 118 in the cutter body and secured in threaded opening 120 formed in the portions 122 of the anvils 110 (see FIG. 14).

The cutting inserts 112 are wafer-like and have two parallel, spaced planar, major walls, one of which is in substantial planar contact with a wall 124 of an anvil 110 when the cutter inserts are mounted in operative position. The cutter inserts 112 are rigidly clamped in operative position by the clamping wedges 114 which are adjustably mounted in the notches 106 for quick adjustment by the adjusting screws 126, which have oppositely threaded portions that are individually respectively received in the threaded bores 128 of the clamping wedges and the threaded bores 130 formed in the cutter body 100. One screw 126 is associated with one clamping wedge 114 in one notch 106, all in the same general manner as their counterparts in the FIGS. 1–7 milling cutter.

The milling cutter of FIGS. 8–16 is designed to be rotated by its driving means in the direction of the arrow in FIG. 8, and is particularly effective for peripheral milling operations. It will be understood that the same general advantages exist in both illustrated milling cutters, and that the basic construction and operation is the same. The principal differences reside in structural alterations to the milling cutter body, and slight alterations in the construction of the cutting teeth assembly parts.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. For use with a conventional milling machine, a removable milling cutter comprising a generally circular disk-like body having a substantially planar face; a plurality of notches in said body and circumferentially spaced about the periphery of said face; a cutting tooth assembly disposed in each of said notches; and each of said assemblies comprising a separate anvil, a separate cutting insert and a separate clamping wedge; said anvils comprising two planar wall portions disposed at right angles to each other, being made of a harder material than said cutter body and rigidly secured to said cutter body individually in said notches with both wall portions thereof in firm planar contact with said body, said cutting inserts being polygonal, wafer-like and individually disposed in said notches, each adjacent one of said anvils in substantial planar contact with one wall portion thereof, having one edge wall in contact with the other wall portion thereof and another edge wall extending beyond said face into cutting position, and said clamping wedges being unitary and individually adjustably secured to said cutter body in said notches, each in substantial planar contact with one of said cutting inserts and arranged to force its associated cutting insert against its associated anvil to thereby securely but removably mount said cutting inserts in said cutter body, whereby said cutting inserts are individually detachably mounted and positioned on said cutter body.

2. A milling cutter as defined in claim 1 wherein said cutter body has a radially extending peripheral ridge which is V-shaped in cross section, the side faces of which are perpendicular to each other, one of said ridge faces being disposed at an angle of approximately 45° to said planar face taken in a central plane passing through the axis of said cutter body, one side wall of each cutting insert being spaced and parallel to one ridge face, and an adjacent side wall thereof being spaced and parallel to the other ridge face.

3. A milling cutter as defined in claim 1 wherein said cutting inserts are square, each wall thereof may be disposed to be used as a cutting implement, one side wall of each of said cutting inserts extends beyond said face into a cutting position in a common plane which is substantially parallel to said planar face and an adjacent side wall thereof extends beyond the periphery of said cutter body into cutting position.

References Cited in the file of this patent

UNITED STATES PATENTS

| | | |
|---|---|---|
| 2,664,617 | Kralowetz | Jan. 5, 1954 |
| 2,751,663 | Leuzinger | June 26, 1956 |
| 2,805,467 | Greenleaf | Sept. 10, 1957 |
| 2,805,469 | Greenleaf | Sept. 10, 1957 |
| 2,814,854 | Murray | Dec. 3, 1957 |
| 2,859,507 | Kuell | Nov. 11, 1958 |
| 2,945,288 | Berry | July 19, 1960 |

FOREIGN PATENTS

| | | |
|---|---|---|
| 667,936 | Great Britain | Mar. 12, 1952 |
| 1,143,568 | France | Apr. 5, 1957 |